March 5, 1940. A. O. McCOLLUM 2,192,680
BRAKING SYSTEM
Filed March 25, 1938
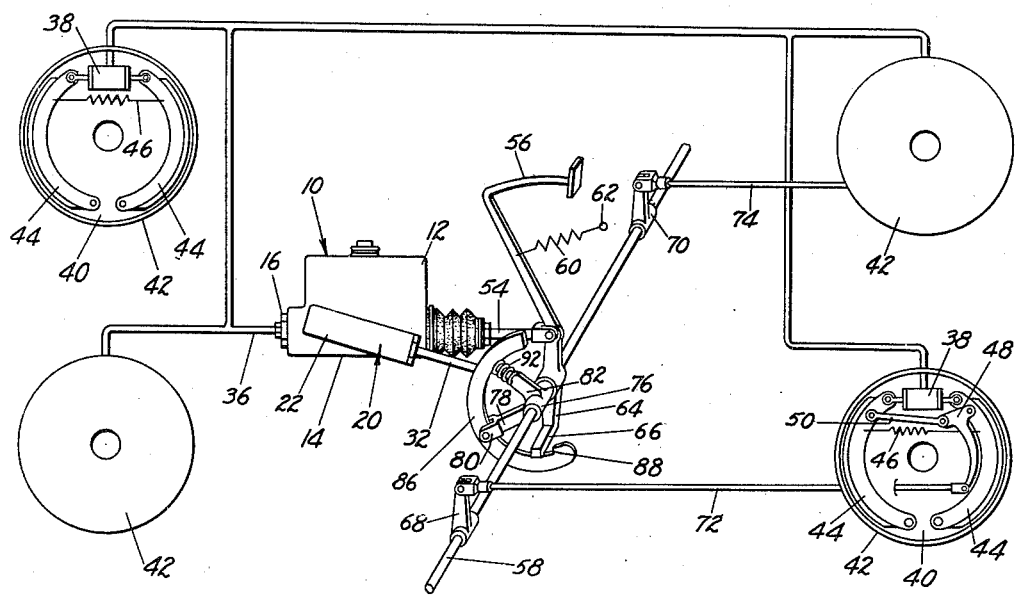
Fig. 1.
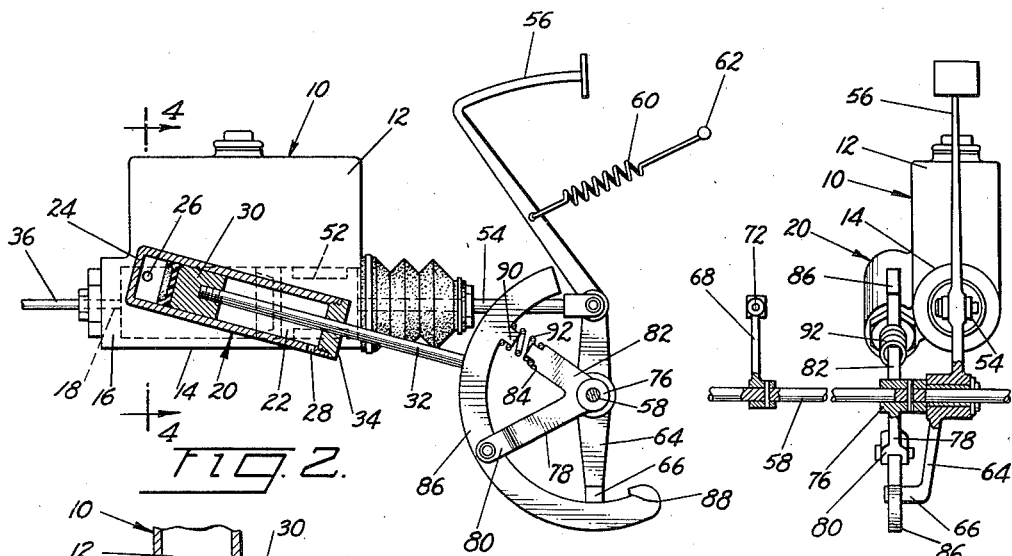
Fig. 2.
Fig. 3.
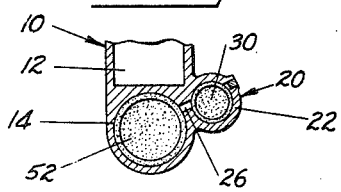
Fig. 4.
INVENTOR.
ANDREW O. McCOLLUM
BY
Williams, Bradbury, McCaleb & Hinkle
ATTORNEYS.

Patented Mar. 5, 1940

2,192,680

UNITED STATES PATENT OFFICE 2,192,680

BRAKING SYSTEM

Andrew O. McCollum, Detroit, Mich., assignor to Hydraulic Brake Company, Detroit, Mich., a corporation of California Application March 25, 1938, Serial No. 197,984

3 Claims. (Cl. 188—106)

This invention relates to braking systems, and more particularly to braking systems for motor vehicles.

Broadly the invention comprehends a fluid pressure braking system for actuating the service brakes of a motor vehicle coupled with a mechanical braking system for actuating the emergency brakes of the vehicle.

An object of the invention is to provide a duplex braking system for a motor vehicle, one a fluid pressure braking system, and the other a mechanical braking system, and to so couple the systems that, in the event of failure of one system, the other system remains effective.

Another object of the invention is to provide a fluid pressure braking system for actuating the brakes of a motor vehicle coupled with a mechanical braking system for actuating the same brakes, both of the systems being operable by a single foot pedal lever.

Other objects of the invention will appear from the following description taken in connection with the drawing forming a part of this specification, and in which—

Fig. 1 is a schematic view illustrating the invention as applied;

Fig. 2 is an enlarged side elevation of the fluid pressure producing device, the coupling between the two systems, and the operating means;

Fig. 3 is an end view of the structure shown in Fig. 2; and

Fig. 4 is a sectional view substantially on line 4—4, Fig. 2.

Referring to the drawing for more specific details of the invention, 10 represents generally a fluid pressure producing device including a reservoir 12 having at its base a cylinder 14 communicating with the reservoir. The cylinder is open at one end and closed at the other end as by a head 16 provided with an exhaust port 18.

A fluid pressure actuated motor 20 associated with the cylinder 14 includes a cylinder 22, open at one end, and closed at the other end as by a head 24. This cylinder has arranged in its wall adjacent the closed end thereof a port 26 providing a communication between the cylinders 14 and 22, and also arranged in the wall of the cylinder 22 adjacent the open end thereof is a port 28 for venting the cylinder to the atmosphere, and a piston 30 reciprocable in the cylinder 22 has a rod 32 extending through a plug 34 fitted in the open end of the cylinder.

A fluid pressure delivery pipe or conduit 36 has branches connected respectively to fluid pressure actuated motors 38, preferably arranged in pairs, one pair for actuating brakes associated with the front wheels of a vehicle and another pair for actuating brakes associated with the rear wheels of the vehicle.

The brakes may be of conventional type. Preferably each of the brakes includes a fixed support or backing plate 40 adapted to be secured to an axle or to an axle housing, a rotatable drum 42 associated with the backing plate and adapted to be secured to a wheel, a pair of corresponding friction elements or shoes 44 pivoted on the backing plate for cooperation with the drum, a retractile spring 46 connecting the shoes, and a motor corresponding to the motors 38 connected between the shoes for actuating the shoes into engagement with the drum against the resistance of the retractile spring.

The brakes associated with the rear wheels of the vehicle are each provided with an auxiliary actuating means for the shoes. As shown, this auxiliary actuating means includes a lever 48 pivoted to one of the shoes and connected by a rod 50 to the other shoe. By applying force to the lever the shoes may be spread into engagement with the drum.

A piston 52, reciprocable in the cylinder 14, has a rod 54 pivotally connected to a foot pedal lever 56 journaled on a rockable cross-shaft 58 and connected by a retractile spring 60 to a fixed support 62. The foot pedal lever has an arm 64 carrying a driver 66, and the shaft has keyed thereon arms 68 and 70 connected as by tension rods 72 and 74 to the levers 48 of the brakes associated with the rear wheels of the vehicle.

The rockable shaft 58 also has keyed thereon a hub 76 supporting an arm 78 having on its free end a clevis 80, and a relatively short arm 82 having thereon a shoulder 84. A segmental member 86 pivotally supported by the clevis 80 beneath the driver 66 has on one end a stop 88 for cooperation with the driver 66, and arranged on the segmental member adjacent the other end thereof is a lug 90. A spring 92 has one end sleeved on the lug and bearing against the segmental member, and the other end of the spring is sleeved on the arm 82 and abuts the shoulder 84. This spring serves to retain the segmental member in engagement with the rod 32 of the piston 30 movable in the cylinder of the motor 20.

In operation, upon depressing the foot pedal lever 56, force is transmitted therefrom through the thrust rod 54 to the piston 52, resulting in movement of the piston on its compression stroke. As the piston advances on its compression stroke, the fluid in the cylinder 14 forward of the piston is displaced therefrom, through the port 26, into the fluid pressure actuated motor 20, resulting in energization of the motor and the consequent movement of the segment 86 against the resistance of the spring 92. This movement of the segment 86 swings the stop 88 out of the path of the driver 66 carried by the foot pedal lever.

Concomitantly with this operation, fluid is displaced from the cylinder 14, through the discharge port 18 and fluid pressure delivery pipe 36 and the respective branches thereof, into the fluid pressure actuated motors 38, resulting in energization of the motors 38 and the consequent movement of the shoes 44 of the respective brakes into engagement with the drums.

Upon release of the foot pedal lever 56, the retractile spring 60 returns the lever to its retracted position. This results in retracting the piston 52 connected to the lever by the rod 54. As the piston 52 moves to its retracted position, pressure on the fluid in the system is released. This results in the return of fluid from the motor 20 by way of the port 26 to the cylinder 14, resulting in return of the motor 20 to static position and movement of the segment 86 under the influence of the spring 92, and this movement of the segment swings the stop 88 in the path of the driver 66 carried by the foot pedal lever.

Concomitantly with this operation, fluid is returning from the fluid pressure actuated motors 38 and the respective branches thereof to the cylinder 14 under the influence of the retractile spring 46 connecting the shoes of the respective brakes, and any excess fluid returned to the cylinder 14 may be displaced therefrom into the reservoir through the conventional compensating port. This completes a normal operation of the braking system.

In the event of failure of the fluid pressure braking system hereinabove described, upon depressing the foot pedal lever 56, the motor 20 is not energized, consequently there is no movement of the segment 86 about its pivotal connection with the clevis 80, and hence the stop 88 remains in the path of the driver 66 carried by the foot pedal lever 56.

Under this condition, the force applied to the foot pedal lever is transmitted through the driver to the segment 86, thence through the arm 78, pivoted to the segment, to the shaft 58, causing movement of the shaft through an angle, and this movement of the shaft is transmitted through the arms 68 and 70 keyed to the shaft and the tension rods 72 and 74, attached to the arms, to the levers 48 of the brakes associated with the rear wheels of the vehicle, resulting in actuation of the shoes 44 into engagement with the drums 42.

In the event of a failure of the fluid pressure braking system during a braking operation, the operator quickly releases the foot pedal lever 56 so that the lever may return to retracted position and engage the driver 66 with the stop, and, thereafter, upon depressing the foot pedal lever, the emergency brake may be effectively actuated.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is—

1. A duplex braking system comprising a fluid pressure system for actuating brakes, a rockable shaft, an arm on the shaft, a segment pivoted on the arm having a stop thereon, means connecting the shaft to the brakes, an operating lever connected to the fluid pressure system, a driver on the operating lever for cooperation with the stop on the segment, and a fluid pressure actuated motor connected to the fluid pressure system operative to swing the segment on its pivot.

2. A duplex braking system comprising a fluid pressure system for actuating brakes, a rockable shaft, means connecting the shaft to the brakes, an operating lever pivoted on the shaft and connected to the fluid pressure system, a driver carried by the lever, an arm keyed to the shaft, a segment pivoted to the arm having a stop thereon, means yieldingly retaining the segment against the driver, and a fluid pressure motor actuated by the fluid pressure system adapted to swing the segment on its pivot.

3. A duplex braking system comprising a fluid pressure system for actuating brakes, a rockable shaft, means connecting the shaft to the brakes, an operating lever pivoted on the shaft and connected to the fluid pressure system, a driver on said lever, a member keyed to the shaft having an arm and a relatively short arm, a segment pivoted to the arm having a stop for cooperation with the driver on the lever, a spring interposed between the short arm and the segment, and a fluid pressure motor actuated by the fluid pressure system adapted to swing the segment on its pivot against the resistance of the spring.

ANDREW O. McCOLLUM.